(12) United States Patent
Neuscheler et al.

(10) Patent No.: US 8,775,841 B2
(45) Date of Patent: Jul. 8, 2014

(54) CIRCUIT CONFIGURATION HAVING A TRANSCEIVER CIRCUIT FOR A BUS SYSTEM AND NODES FOR A BUS SYSTEM

(75) Inventors: Marco Neuscheler, Reutlingen (DE); Christian Reger, Riedering (DE); Ricardo Erckert, Bad Aibling (DE); Axel Wenzler, Rottweil (DE)

(73) Assignee: Robert Bosch GmbH, Stuttgart (DE)

( * ) Notice: Subject to any disclaimer, the term of this patent is extended or adjusted under 35 U.S.C. 154(b) by 419 days.

(21) Appl. No.: 12/998,575

(22) PCT Filed: Sep. 25, 2009

(86) PCT No.: PCT/EP2009/062416
§ 371 (c)(1),
(2), (4) Date: Jul. 20, 2011

(87) PCT Pub. No.: WO2010/052064
PCT Pub. Date: May 14, 2010

(65) Prior Publication Data
US 2011/0271130 A1 Nov. 3, 2011

(30) Foreign Application Priority Data
Nov. 10, 2008 (DE) .......................... 10 2008 057 613

(51) Int. Cl.
*G06F 1/26* (2006.01)
*G06F 1/32* (2006.01)

(52) U.S. Cl.
USPC ............ 713/323; 713/320; 713/322; 713/324

(58) Field of Classification Search
USPC .................................. 713/320, 322, 323, 324
See application file for complete search history.

(56) References Cited

U.S. PATENT DOCUMENTS

| 6,037,675 | A | 3/2000 | Yoshida et al. | |
|---|---|---|---|---|
| 6,438,462 | B1 | 8/2002 | Hanf et al. | |
| 6,519,720 | B1 | 2/2003 | Mores | |
| 6,804,591 | B1 * | 10/2004 | Miyazawa | 701/36 |
| 7,203,847 | B2 * | 4/2007 | Park | 713/300 |
| 7,539,888 | B2 * | 5/2009 | Hu et al. | 713/324 |
| 2003/0034823 | A1 * | 2/2003 | Hiraki et al. | 327/334 |
| 2006/0161792 | A1 * | 7/2006 | Paul et al. | 713/300 |
| 2007/0230484 | A1 | 10/2007 | Hu et al. | |
| 2007/0275704 | A1 * | 11/2007 | Terai | 455/414.1 |
| 2010/0045249 | A1 * | 2/2010 | Park et al. | 323/282 |
| 2013/0200944 | A1 * | 8/2013 | Enjalbert et al. | 327/543 |

FOREIGN PATENT DOCUMENTS

| CN | 1367889 | 9/2002 |
|---|---|---|
| CN | 101019087 | 8/2007 |
| WO | WO 2007/098411 | 8/2007 |

* cited by examiner

*Primary Examiner* — Vincent Tran
(74) *Attorney, Agent, or Firm* — Kenyon & Kenyon LLP

(57) ABSTRACT

A circuit configuration for a node of a bus system includes a transceiver circuit and a control circuit connected to the transceiver circuit. The transceiver circuit has an idle mode, in which it has a reduced power consumption in comparison with at least one operating mode, and the transceiver circuit is supplied with power in the at least one operating mode via a power supply unit integrated into the transceiver circuit. The control circuit is connected to the power supply unit to supply the control circuit with power in the idle mode, and the circuit configuration has a controllable voltage regulator which is coupled to the transceiver circuit in such a way that the voltage regulator is deactivated in the idle mode to reduce the power consumption and activated in the operating mode to supply power to the transceiver circuit and the control circuit.

3 Claims, 2 Drawing Sheets

CIRCUIT CONFIGURATION HAVING A TRANSCEIVER CIRCUIT FOR A BUS SYSTEM AND NODES FOR A BUS SYSTEM

BACKGROUND OF THE INVENTION

1. Field of the Invention

The present invention relates to a circuit configuration having a transceiver circuit and a bus system node having such a circuit configuration.

2. Description of Related Art

Control units, sensor systems and actuator systems in a motor vehicle or commercial vehicle in particular are often interconnected with the help of a communication system such as the bus system known by the FlexRay brand name. Communications traffic on the bus system, access mechanisms and receiving mechanisms, as well as error handling are regulated via a protocol. FlexRay is a fast, deterministic and error-tolerant bus system for use in motor vehicles in particular. The FlexRay protocol operates according to the principle of time division multiple access (TDMA), in which fixed time slots are assigned to subscribers and to the messages to be transmitted; during these time slots, the subscribers have exclusive access to the communications link. The time slots are repeated in a fixed cycle, so that the point in time when a message is transmitted over the bus is precisely predictable, and bus access is deterministic.

To optimally utilize the bandwidth for transmission of messages on the bus system, FlexRay subdivides the cycle into a static part and a dynamic part. The fixed time slots are in the static part at the beginning of a bus cycle. The time slots are dynamically predetermined in the dynamic part. Exclusive bus access is then enabled only for a short period of time, for the duration of at least one so-called minislot. The time slot is lengthened by the required time only if bus access occurs within a minislot. Bandwidth is thus used only if it is actually needed. FlexRay communicates via two physically separate lines, each at a data rate of max. 10 Mbit/sec. FlexRay may also be operated at lower data rates. Channels implemented via these lines correspond to the physical layer, in particular the so-called OSI (open system architecture) layer model. Two channels are used mainly for redundant and thus error-tolerant transmission of messages, but different messages may also be transmitted, which would then double the data rate. The messages are usually transmitted with the help of a differential signal, i.e., the signal transmitted over connecting lines is obtained from the difference between the individual signals transmitted over the two lines. The layer above the physical layer in the layer model is designed in such a way that an electrical or an optical transmission of the signal(s) over the line(s) or transmission by another route is possible.

When such a bus system is used in a vehicle in particular, care must be taken to ensure that the nodes of the bus system consume little power when not actually needed. This may be the case, for example, when functions to be executed by the nodes are not active or when the vehicle is not in operation. The nodes therefore have an idle mode in which a few parts of the nodes are deactivated. When changing from the idle mode to an operating mode, the microcontroller must be completely restarted, which takes a relatively long time. This results in a substantial delay in leaving the idle mode. The nodes of the bus system in the idle mode are thus able to respond to a certain event only with a relatively long response time.

BRIEF SUMMARY OF THE INVENTION

An object of the present invention is to provide a circuit configuration for a node having a transceiver circuit for a bus system in which a change from an idle mode to an operating mode is possible in the shortest possible time.

According to the present invention, the control circuit and the microcontroller need not be deactivated completely in the idle mode because the voltage regulator is deactivated, but they may remain in a state of low power consumption, supplied with power by the power supply unit of the transceiver circuit. Therefore, a complete and time-consuming restart of the control unit is not necessary when changing from the idle mode back to the operating mode. This achieves a particularly short delay in changing from the idle mode to the operating mode.

If the circuit configuration is implemented using a switch element, power consumption by the circuit may be reduced further because current flow back from the power supply unit to the deactivated voltage regulator is at least largely prevented by the switch element.

The novel approach having an integrated power supply unit (low-power regulator) and switches between VBUF pin and VCC pin permits faster wakeup (changing from the idle mode to the operating mode) of the system and prevents current flow into the Vout pin of the external voltage regulator.

The power supply unit may be designed to be a low-power regulator, which is integrated into the transceiver circuit, and may be optimized for low power consumption (slow, inaccurate). During active operation, the better (faster, more accurate) regulating, properties of the external regulator may be utilized.

The dissipation of heat by the system during active operation is distributed between two ICs (external voltage regulator and FlexRay transceiver). Operation at higher ambient temperatures than when the power regulator is integrated into the FlexRay transceiver is therefore possible.

DETAILED DESCRIPTION OF THE INVENTION

Figure 1:
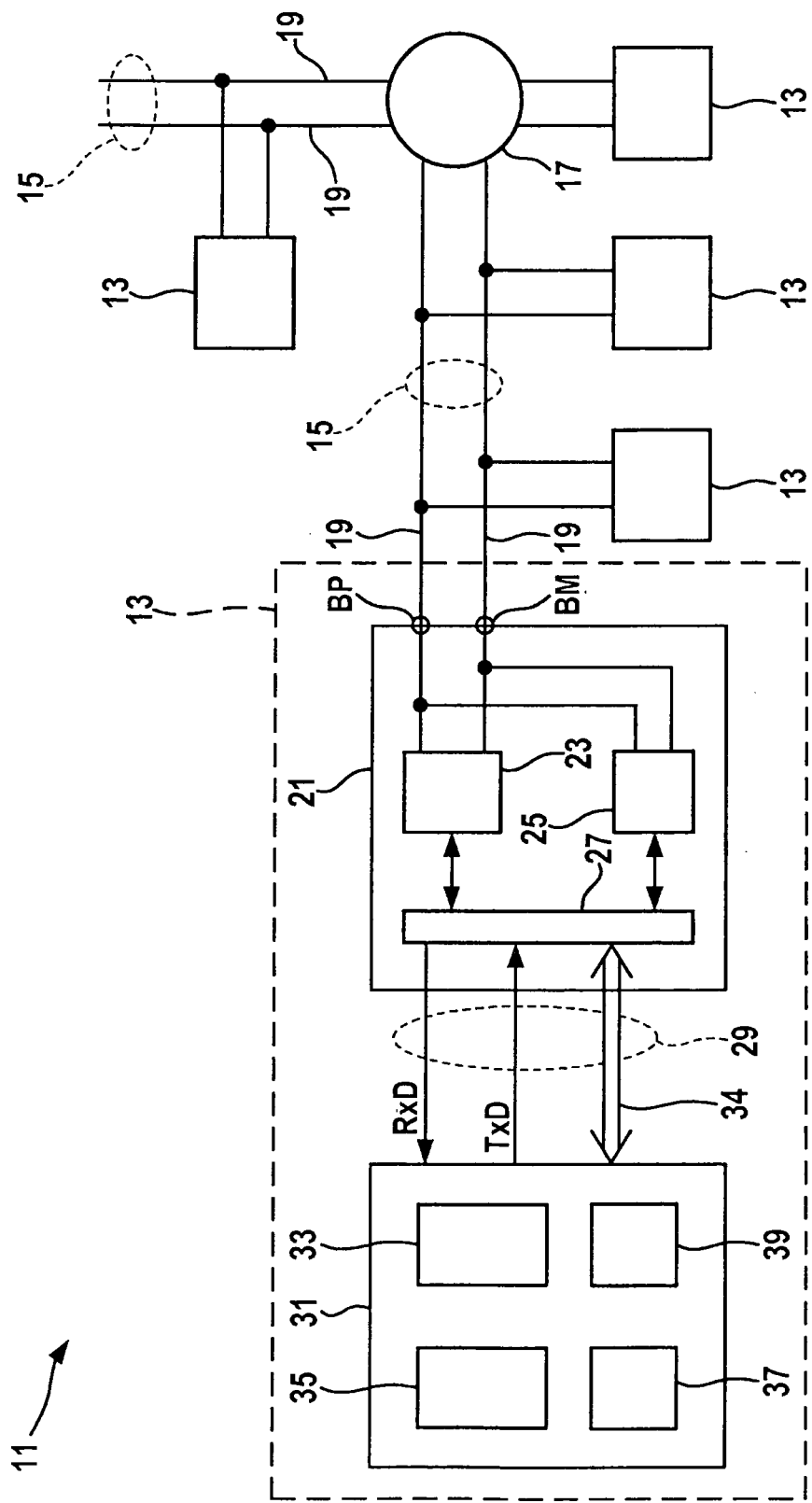
FIG. 1 shows a bus system having a plurality of nodes according to a preferred specific embodiment.

FIG. 1 shows a bus system 11, to which a plurality of nodes 13 is connected. Bus system 11 may be a FlexRay communication system and thus bus system 11 may be designed according to the specifications of the FlexRay Consortium.

Individual nodes 13 are interconnected via bus lines 15 either directly or indirectly via a star coupler 17. Each bus line 15 is designed to be a cable having at least one pair of leads composed of two leads 19, each forming an electrical conductor. Bus system 11 thus has one channel for transmission of data, this channel being formed by leads 19 of the pair of leads. In one specific embodiment (not shown), bus system 11 may have a plurality of channels, preferably two channels, which is embodied by two separate pairs of leads (not shown). Due to the use of two channels, the useful data rate of data transmissions among nodes 13 may be increased by transmitting different data over the two channels. Since the bus system is able to continue operating even when there is a defect in one of the two pairs of leads, this imparts greater failure safety to bus system 11.

Each node 13 has a transceiver circuit 21, which is preferably designed to be an integrated circuit. A first bus port BP and a second bus port BM of transceiver circuit 21 are each connected to one of leads 19 of one of bus lines 15.

Transceiver circuit 21 has a receiver circuit 23 for receiving data over bus line 15 and has a transmitter circuit 25 for transmitting data over corresponding bus line 15, to which node 13 is connected. Receiver circuit 23 and transmitter circuit 25 are both connected to both bus ports BP and BM within transceiver circuit 21. Receiver circuit 23 and transmitter circuit 25 are both equipped for transmitting a differential digital signal via the pair of leads of bus line 15, which is connected to corresponding transceiver circuit 21.

Transceiver circuit 21 also has a logic unit 27, which is coupled to receiver circuit 23 and to transmitter circuit 25. Logic unit 27 has terminals for connecting transceiver circuit 21 to a control circuit formed by a microcontroller 31 or a microcomputer, for example. These terminals and lines connected thereto form an interface 29 between transceiver circuit 21 and the control circuit, i.e., microcontroller 31.

Microcontroller 31 has a communication controller 33 for controlling communication operations between nodes 13 via bus line 15. Communication controller 33 is equipped for controlling the communication operations according to the protocols of bus system 11, in particular for executing media access operations of bus system 11. Communication controller 33 may also be equipped for calculating checksums of data frames to be transmitted over bus line 15, for example, according to the CRC, method and/or for checking the checksums of received data frames.

In particular a line RxD for transmitting data received by transceiver circuit 21 over bus line 15, from transceiver circuit 21 to communication controller 33, and a line TxD for transmitting data to be sent by transceiver circuit 21 over bus line 15, from communication controller 33 to transceiver circuit 21, are provided as interface lines in particular. In addition to two lines RxD and TxD, interface 29 also includes other lines 34, which may function to exchange control information between communication controller 33 and transceiver circuit 21, for example.

Microcontroller 31 has a computing core 35, memory 37 (working memory and/or read-only memory) as well as input and output devices 39. Microcontroller 31 may be equipped to execute additional protocol software and/or application programs.

In the specific embodiment shown here, communication controller 33 is integrated into microcontroller 31. In a specific, different embodiment (not shown), communication controller 33 is designed to be a circuit separate from microcontroller 31, preferably to be an integrated circuit.

Figure 2:
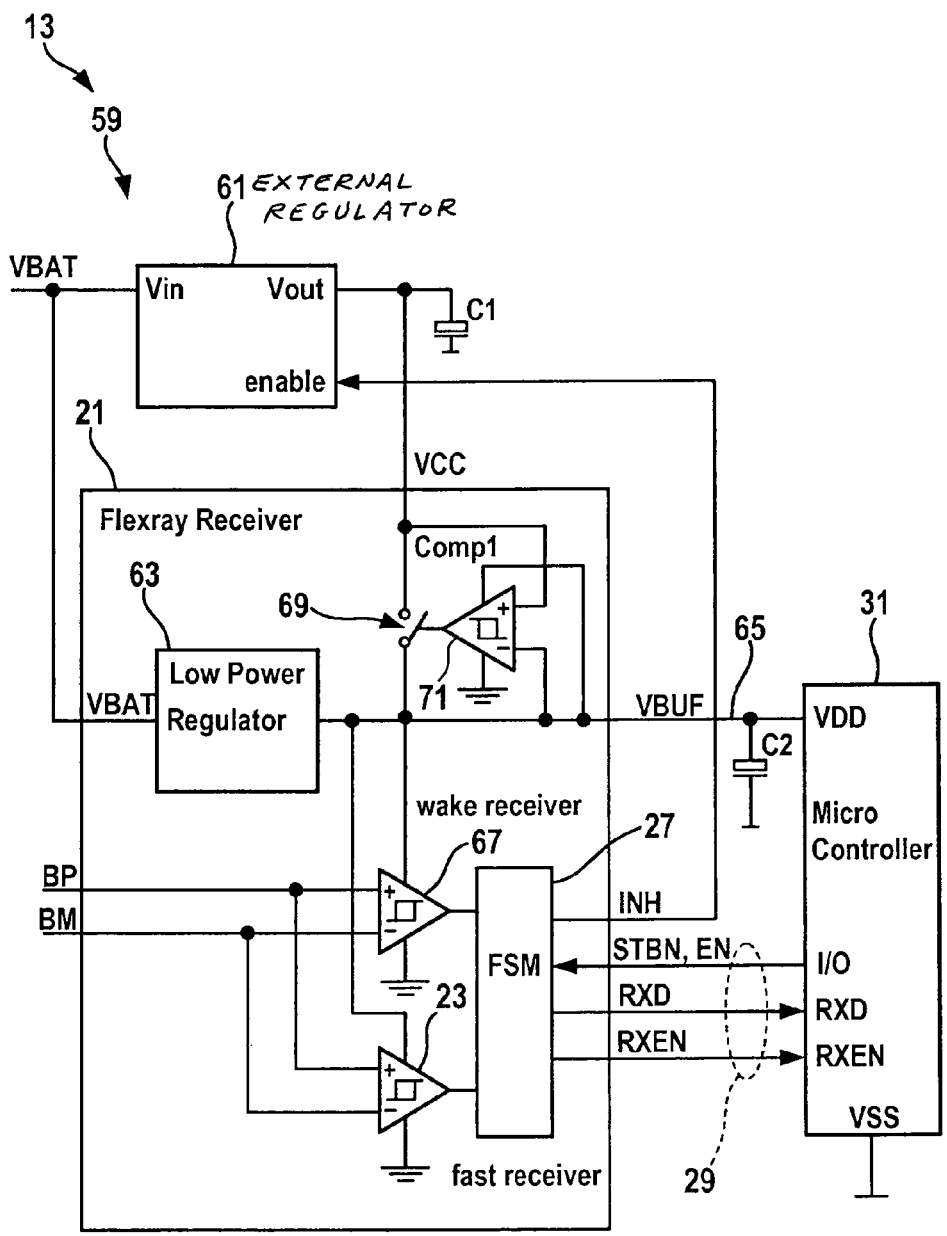
FIG. 2 shows a circuit configuration of a node from FIG. 1.

FIG. 2 shows a detailed view of a circuit configuration 59 forming a part of node 13, including a detail of transceiver circuit 21. Node 13 may be seen here as having an external voltage regulator 61 with respect to transceiver circuit 21 for generating a power supply voltage VCC. One input Vin of voltage regulator 61 is connected to a battery voltage terminal VBAT of node 13.

Transceiver circuit 21 has a power supply unit 63 having an input, which is also connected to battery voltage terminal VBAT. One output of power supply unit 63 is connected to a power supply line 65. At least a few parts of transceiver circuit 21, in particular a receiving device 67 of transceiver circuit 21 and a power supply voltage terminal VDD of microcontroller 31, are connected to power supply line 65. Receiving device 67 forms a wakeup receiver 67 for monitoring bus line 15 for signals, states or state sequences necessitating a change of node 13 from an idle mode to an operating mode. Furthermore, a buffer capacitor C2 is situated between power supply line 65 and ground.

A semiconductor switch element 69, which may be designed to be a transistor, for example, is situated between an output Vout of voltage regulator 61 and power supply unit 63. A control input of semiconductor circuit 69 is connected to an output of a trigger element 71 designed to be a comparator comp1. Furthermore, output Vout of voltage regulator 61 is connected to a capacitor C1, which is also connected to ground.

Voltage regulator 61 is designed to be a controllable voltage regulator 61. It has an "enable" control input, which is connected to a control output INH of logic unit 27, so that logic unit 27 is able to activate and deactivate voltage regulator 61.

The functioning of circuit configuration 59 shown in FIG. 2 is explained in greater detail below with reference to that figure.

Circuit configuration 59 uses power supply unit 63, which is implemented as a low-power regulator 63 integrated into transceiver circuit 21 and is designed to supply a few µA to wakeup receiver 67 and to charge buffer capacitor C2. Buffer capacitor C2 may supply power briefly (for a few ms) to receiving circuit 23 and to microcontroller 31.

Before waking, i.e., in the idle mode, only low-power regulator 63 and wakeup receiver 67 are active. In the idle mode, circuit configuration 59 is supplied with power exclusively via power supply unit 63 (low-power regulator 63). Capacitor C2 is charged by low-power regulator 63. Switch 69, which is controlled by comparator comp1, is open to prevent current from flowing from low-power regulator 63 into a regulating return of external voltage regulator 61. C1 is discharged. Microcontroller 31 is in an operating mode referred to as STOP mode, having a low power consumption before waking.

This yields the following waking sequence for changing from the idle mode into the operating mode:

| Operation | Simultaneous operation | Time required | Cumulative time |
|---|---|---|---|
| Signal to BP, BM wakes FlexRay transceiver 21 | | approx. 20 µs | approx. 20 µs |
| Microcontroller 31 changes from STOP mode to an active mode | Signal INH (see FIG. 2) activates external voltage regulator 61. C2 supplies power to microcontroller 31 | approx. 100 µs | 0.12 ms |
| Microcontroller 31 switches receiving circuit 23 on via signals STBN, EN | Voltage regulator 61 starts. C2 supplies power to microcontroller 31 and receiving circuit 23 | approx. 5 µs | 0.125 ms |
| Data transmission begins | Voltage regulator 61 starts. C2 supplies power to microcontroller 31 and receiving circuit 23 | Time is relevant only for dimensioning of C2 | 0.125 ms |
| Voltage VCC exceeds the voltage across VBUF | comp1 closes the switch between VCC and VBUF | | |

However, the result with known circuit configurations is a much longer time for changing from idle mode to operating mode (see table below).

Known FlexRay transceivers 21 have a receiving amplifier 67, which is supplied with power by VBAT (battery voltage) and only awakens the system, and they have a fast receiving circuit 23 (fast input amplifier: fast receiver 23) for the data transmission. Receiving circuit 23 is supplied with power from the 5-volt power supply (VCC) for reasons of accuracy and for thermal reasons.

To minimize power consumption by the system when it is in standby mode, receiving circuit 23 and 5-volt voltage regulator 61 (usually external) are shut down in standby mode. On waking the system, the following sequence is usually run through with known transceiver circuits 21:

| Operation | Time required | Cumulative time |
|---|---|---|
| Signal to BP, BM wakes FlexRay transceiver 21 | approx. 20 μs | approx. 20 μs |
| INH2 activates voltage regulator 61 | approx. 1 ms | 1.02 ms |
| Reset (restart) of microcontroller 31 including boot sequence | approx. 20 ms | 21.02 ms |
| Microcontroller activates receiving circuit 23 | 2 μs | 21.022 ms |
| Data transmission begins | | 21.025 ms |

What is claimed is:

1. A circuit system for a node of a bus system, comprising:
a transceiver circuit configured to selectively operate in at least an idle mode and in an operating mode, wherein the transceiver circuit has a lower power consumption in the idle mode in comparison to the operating mode, and wherein the transceiver circuit is supplied with power via a power supply unit integrated into the transceiver circuit;
a control circuit connected to the transceiver circuit, wherein the control circuit is connected to the power supply unit for supplying power to the control circuit in the idle mode;
a controllable voltage regulator coupled to the transceiver circuit, wherein the voltage regulator is (i) selectively deactivated in the idle mode to reduce power consumption and (ii) selectively activated in the operating mode to supply power to the transceiver circuit and the control circuit; and
a controllable switch element situated between an output of the voltage regulator and an output of the power supply unit, wherein the controllable switch element is coupled to a trigger element for triggering the switch element, and wherein the output of the power supply and the output of the voltage regulator are electrically separated from one another by the switch element when the controllable voltage regulator is deactivated and the transceiver circuit is supplied with power via a power supply unit integrated into the transceiver circuit.

2. The circuit system as recited in claim 1, wherein at least one of: (i) the transceiver circuit is configured to be connected to a FlexRay system; and (ii) the control circuit is a microcontroller.

3. The circuit system as recited in claim 1, wherein the transceiver circuit has a receiving device coupled to a bus line of the bus system, the receiving device being configured to detect at least one of a state of the bus line, a change in state of the bus line, and a chronological sequence of states of the bus line, and wherein the receiving device is configured to change a mode of operation of the transceiver circuit from the idle mode to the operating mode after detecting the at least one of the state of the bus line, the change in state of the bus line, and the chronological sequence of states of the bus line.

* * * * *